United States Patent [19]

Dickinson

[11] Patent Number: 4,907,898
[45] Date of Patent: Mar. 13, 1990

[54] ROLLER BEARING WITH SINGLE FLANGE RACES

[75] Inventor: Thorn W. Dickinson, Berlin, Conn.

[73] Assignee: The Torrington Company, Torrington, Conn.

[21] Appl. No.: 292,853

[22] Filed: Jan. 3, 1989

[51] Int. Cl.⁴ .................. F16C 33/38; F16C 33/58
[52] U.S. Cl. .................................. 384/564; 384/572
[58] Field of Search ............... 384/564, 576, 572, 569, 384/571

[56] References Cited

U.S. PATENT DOCUMENTS

| 4,136,916 | 1/1979 | Musselman et al. | 384/576 |
| 4,391,476 | 7/1983 | Negele et al. | 384/572 |
| 4,523,862 | 6/1985 | Yasui et al. | 384/572 |

Primary Examiner—Lenard A. Footland
Attorney, Agent, or Firm—Frank S. Troidl

[57] ABSTRACT

The bearing has structure for retaining the cage and roller assembly in a single flanged roller bearing race. The structure includes a single flange race which retains a cage and roller assembly by means of a small flange on a cage end rim which cooperates with a shoulder formed on the flange of the race.

4 Claims, 2 Drawing Sheets

ROLLER BEARING WITH SINGLE FLANGE RACES

This invention relates in general to bearings, more specifically, to a roller bearing assembly which includes a flanged race, rollers, and cage or retainer, for improved lubrication of the bearing in high speed operation.

In high speed bearing operation, lubricant is forced toward the outer race by centrifugal force. Outer race shoulders, located outboard of the rollers to limit the rollers axially to the outer race, block passage of lubricant to and from the bearing in this high activity, critical outer race area. Lubricant which is centrifugally driven to, and trapped in the area, tends to churn about. This increases drag and reduces the chance of obtaining a continuous lubricant film on the local bearing surfaces.

Elimination of one shoulder on the outer race provides a low pressure avenue for outflow of centrifugally collected lubricant. It also provides for direct access to the bearing and outer race contact area for introduction of lubricant.

A roller, retainer, and bearing race assembly built to take up end-thrust from the shaft that the bearing is mounted upon, and to prevent the shaft from moving longitudinally in one direction, is disclosed by Burt E. Dohner, et al. in U.S. Pat. No. 1,108,722, patented Aug. 25, 1914. The assembly permits conical ends on the rollers to engage opposed, obtusely rising annular shoulders, one each per inner and outer race.

The rollers are held in a retainer which comprises a shell having inclined annular portions that terminate in annular flanges, for enclosing the rollers between the shell and the inner race. The shell includes ears on one of the annular flanges for engaging an outer surface of the inner race annular shoulder, distal from the rising surface. This prevents the shell from moving longitudinally relative to the inner race in one direction while the shoulder prevents the rollers and shell from moving in the opposite direction. This arrangement permits the assembly of shell, rollers and inner bearing race to be handled as a unit.

The rollers are mounted between the shell of the retainer and the inner ring. The shell has longitudinal openings that are chamfered on their underside to permit the rollers to project out of the shell while they are still retained by the shell between it and the inner race, so that they can engage the outer race. Each longitudinal opening has enlarged openings at each end to permit the conical ends of the rollers to engage the rising annular shoulders.

Edward W. Molloy in U.S. Pat. No. 3,940,193, patented Feb. 24, 1976, discloses a retainer, that is less costly to construct, for holding bearing rollers between the retainer and the inner race of an angular contact roller bearing. The retainer is formed with an annular series of punched out windows in a strip of sheet metal, with the strips between the windows serving as separator bars for the rollers, and with an annular band traversing each end of the windows, as is common for radial roller bearings. The bars are bent near the annular bands, so that the bars are generally parallel to the rollers, while the annular bands remain parallel to one another and may even share the same radius with respect to the axis of the bearing. One band includes a number of circumferentially spaced lanced tabs which are resilient enough to snap past a thrust shoulder at the large diameter end of the inner race, and rigid enough so that they cooperate with the shoulder to retain the separator, rollers and inner race as a unit.

As with radial bearings, the separator bars may be also bent out of parallel with the axis of the roller in one or more places in order to improve retention of the roller.

Briefly described, the invention comprises a bearing race and cage and roller assembly. The race has an annular flange with at least one retention member extending in a radial direction. The cage has at least one retention member extending in the opposite radial direction. The cage retention member cooperates with the race retention member to limit axial movement of the cage in one axial direction, and the rollers cooperate with the race annular flange to limit axial movement of the cage in the other axial direction.

The invention, as well as its many advantages, will be further understood by reference to the following detailed description and drawings in which.

Figure 1:
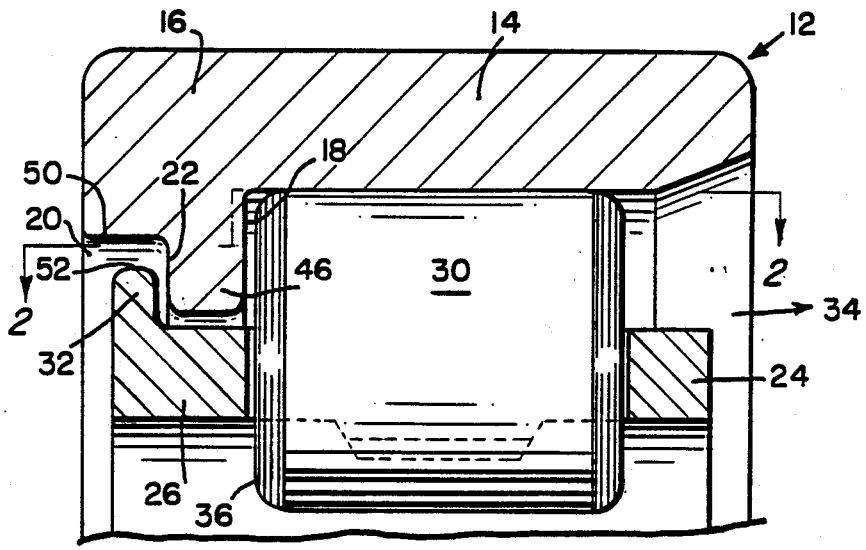
FIG. 1 is a cross-sectional view of a portion of a partially assembled bearing.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In the various figures, like parts are referred to by like numbers.

Turning to the drawings, FIG. 1 shows a single roller portion of a bearing 12 made according to a preferred embodiment of the invention. The outer race 14 includes a single annular flange 16 at one axial end with a radially inwardly extending axially inwardly facing annular shoulder 18. A counterbore 20 extends partially through the flange 16 to form the radially inwardly extending axially outwardly facing annular shoulder 22. Shoulder 18 is longer than shoulder 22.

The cage has axially spaced apart end rims 24 and 26 which are interconnected by circumferentially separated cross-bars 28 to provide roller pockets for rollers 30.

The end rim 26 has a radially outwardly extending retention member 32 in the shape of an annular flange and located axially outwardly from outer race shoulder 22. Retention member 32 cooperates with the annular outer race shoulder 22 to limit the movement of the cage in the direction represented by arrow 34. During normal operation of the outer race and cage and roller assembly with a second race, flange 32 is axially separated from outer race shoulder 22.

Bearing roller 30 is snapped into the cage after the cage is fully inserted into the outer race. Once the roller is in place, the cage cannot be withdrawn from the outer race because movement of the cage and roller assembly in the direction of arrow 34 causes the flange 32 of the end rim 26 to contact shoulder 22 on the outer race. Movement of the cage and roller assembly in the other axial direction causes the end surfaces 36 of rollers 30 to contact shoulder 18 of flange 16 to limit axial movement of the cage and roller assembly.

Figure 2:
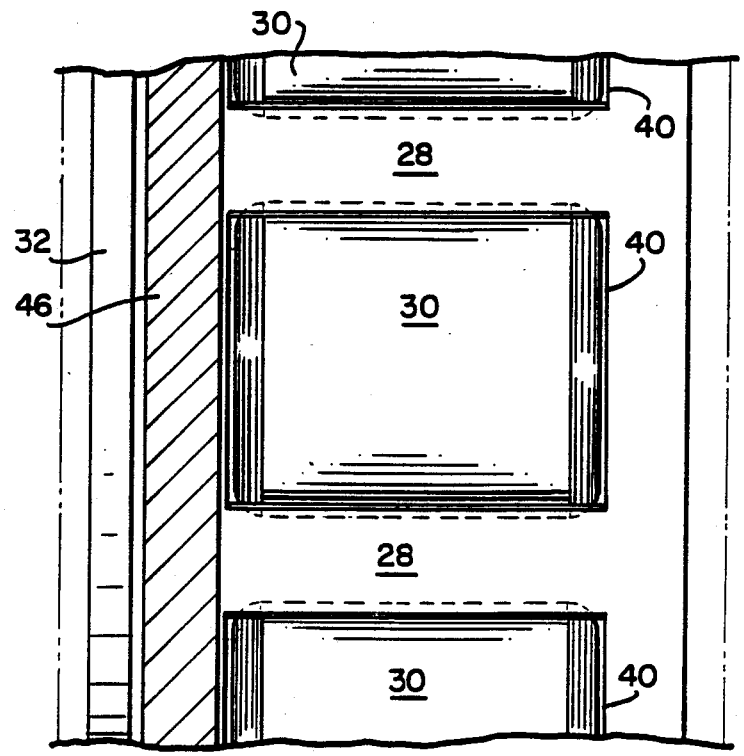
FIG. 2 is a view of the bearing of FIG. 1, taken at 2—2.

Referring to FIG. 2, the roller is snapped into window 40. Retention member 32 may be a continuous flange, as shown, or spaced projections, as long as it presents at least one surface opposed to annular flange 46 of outer race 14 to stop the cage at a predetermined depth when the cage is inserted into the outer race.

Flange 32, and outer race retention member 46 are preferably made of a non-yielding material, since they slide into abutment rather than snap over one another. Cage cross-bars 28 must be compliant enough to allow the roller entry into the window, yet rigid enough to retain it within the window until an inner race is joined with the assembly.

The diameter of surface 50 of the counterbore 20 of the outer race is sufficiently larger than the diameter of surface 52 of the flange 32 so that they do not abut during operation of the bearing. At the open end of race 14, an annular opening for passage of lubricant into and out of the assembly is defined by the race and the end rim 24.

Figure 3:
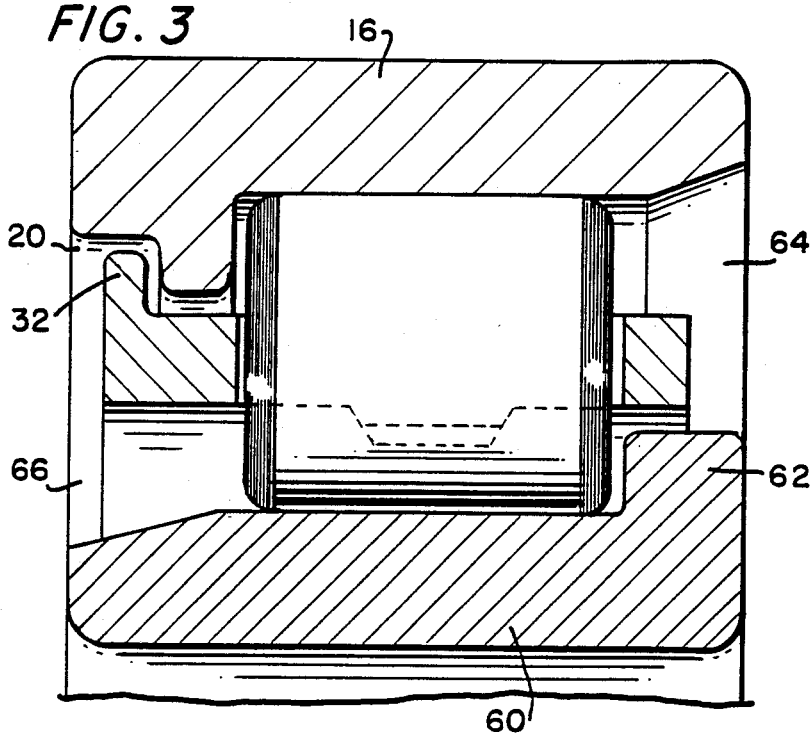
FIG. 3 is a cross-sectional view showing the outer race and cage and roller assembly of FIGS. 1, and 2 assembled on an inner race, thus providing the completely assembled bearing.

FIG. 3 shows the outer race and cage and roller assembly of FIGS. 1 and 2 assembled on an inner race to form the completed bearing. The annular inner race 60 has a radially outwardly extending annular flange 62. The annular flange 62 is located at one axial end of the inner race 60 and is the only flange on the inner race. The annular flange 62 of inner race 60 is axially spaced from and located at the opposite axial end of the bearing from the outer race radially inwardly extending annular flange 16. Annular openings 64 and 66 at the opposite ends of the bearing ease the way for flow of lubricant through the bearing during operating of the bearing. The dimensions of the parts of the bearing are such that flange 32 is always completely within counterbore 20 and never sticks out from the bearing.

Figure 4:
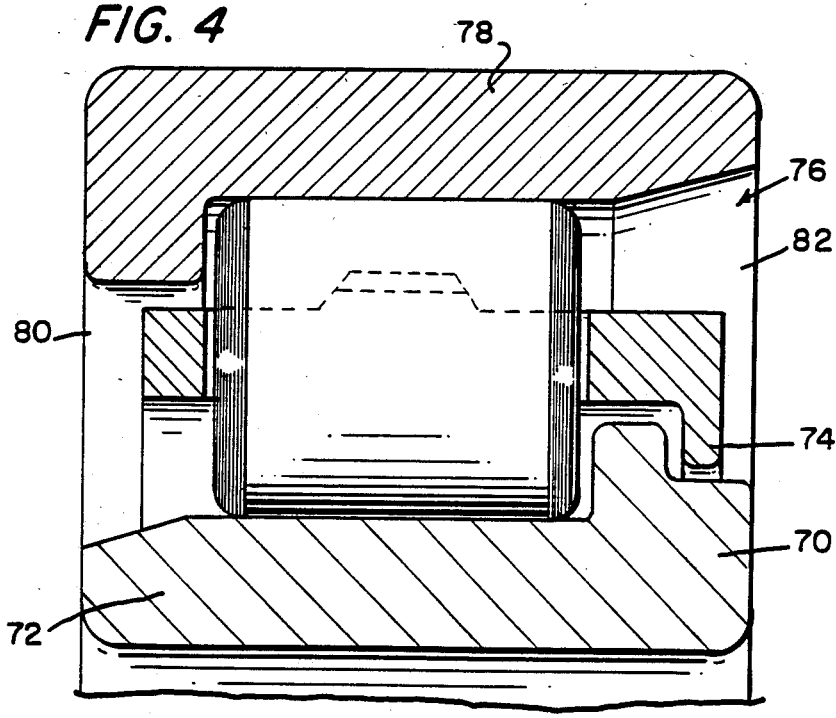
FIG. 4 is a cross-sectional view showing an inner race and roller assembly assembled in an outer race.

Improved lubricant access to the bearing may alternatively be provided according to the embodiment of FIG. 4, by having a radially outwardly extending flange 70 on one end of the inner race 72 of a bearing, and a radially inwardly extending mating flange 74 on one end of a cage 76, so that when the cage is slipped over the race, the windows of the cage locate over the inner race. The opposite ends of the races 72 and 78 define openings 80 and 82 which ease the way for flow of lubricant into and out of the bearing.

Although the present invention has been described with respect to certain embodiments, it shall be understood that it is not limited to them, limitation being determined by the following claims:

I claim:

1. A bearing race and cage and roller assembly comprising: an annular race; and an annular cage and roller assembly, the annular race having an annular flange with at least one non-yielding retention member extending in one radial direction and the cage having at least one non-yielding retention member extending in the opposite radial direction, the cage retention member cooperating with the race retention member to limit axial movement of the cage in one axial direction, and the rollers cooperating with the race annular flange to limit axial movement of the cage in the other axial direction.

2. A bearing in accordance with claim 1, wherein the race non-yielding retention member is an annular shoulder formed on the race annular flange.

3. A bearing in accordance with claim 2, wherein the annular race is an outer race, the annular flange extends radially inwardly from one axial end, and the non-yielding cage retention member extends radially outwardly.

4. A bearing comprising: an annular outer race having an open axial end and a radially inwardly extending annular flange at its other axial end having a radially inwardly extending axially inwardly facing shoulder, said annular flange having a counterbore extending axially partially through the annular flange to form a radially inwardly extending annular shoulder facing axially outwardly; an annular inner race having a single radially outwardly extending annular flange, only, which is axially spaced from the annular outer race radially inwardly extending annular flange; a cage having axially spaced apart end rims and circumferentially separated cross-bars interconnecting said end rims to provide roller pockets; rollers in said roller pockets, one end rim of the cage having at least one radially outwardly extending retention member located axially outwardly from the outer race annular flange axially outwardly facing shoulder to limit axial movement of the cage in one axial direction, and the rollers cooperating with said annular outer race flange axially inwardly facing shoulder to limit axial movement of the cage in the other axial direction.

* * * * *